US008577909B1

(12) United States Patent
Hodge et al.

(10) Patent No.: US 8,577,909 B1
(45) Date of Patent: Nov. 5, 2013

(54) QUERY TRANSLATION USING BILINGUAL SEARCH REFINEMENTS

(75) Inventors: Vanessa Hodge, San Francisco, CA (US); Kevin Law, San Francisco, CA (US); Gaurav Garg, Palo Alto, CA (US); Radhika Malpani, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 139 days.

(21) Appl. No.: 12/481,448

(22) Filed: Jun. 9, 2009

Related U.S. Application Data

(60) Provisional application No. 61/178,830, filed on May 15, 2009.

(51) Int. Cl.
*G06F 17/30* (2006.01)

(52) U.S. Cl.
USPC ........... 707/760; 707/706; 707/713; 707/758; 706/12; 706/14; 706/45; 715/200

(58) Field of Classification Search
None
See application file for complete search history.

(56) References Cited

U.S. PATENT DOCUMENTS

| | | | |
|---|---|---|---|
| 5,893,095 A | 4/1999 | Jain et al. | |
| 5,911,139 A | 6/1999 | Jain et al. | |
| 5,913,205 A | 6/1999 | Jain et al. | |
| 6,006,221 A * | 12/1999 | Liddy et al. ........................... | 1/1 |
| 6,078,916 A | 6/2000 | Culliss | |
| 6,381,598 B1 * | 4/2002 | Williamowski et al. .......... | 704/1 |
| 6,526,400 B1 | 2/2003 | Takata et al. | |
| 6,594,654 B1 * | 7/2003 | Salam et al. ........................... | 1/1 |
| 6,604,101 B1 | 8/2003 | Chan et al. | |
| 6,640,218 B1 | 10/2003 | Golding et al. | |
| 6,701,309 B1 | 3/2004 | Beeferman et al. | |
| 6,757,646 B2 | 6/2004 | Marchisio | |
| 6,983,270 B2 | 1/2006 | Rippich | |
| 7,047,182 B2 | 5/2006 | Masuichi | |
| 7,130,849 B2 | 10/2006 | Yayoi et al. | |
| 7,146,358 B1 * | 12/2006 | Gravano et al. ...................... | 1/1 |
| 7,165,080 B2 | 1/2007 | Kotcheff et al. | |
| 7,260,570 B2 * | 8/2007 | Brown et al. .......................... | 1/1 |
| 7,421,097 B2 | 9/2008 | Hamza et al. | |
| 7,668,823 B2 | 2/2010 | Oldham et al. | |
| 7,672,831 B2 * | 3/2010 | Todhunter et al. ................. | 704/4 |

(Continued)

OTHER PUBLICATIONS

Aitao Chen, "Multilingual Information Retrieval Using English and Chinese Queries", University of California at Berkeley, 2002.*

(Continued)

*Primary Examiner* — Hung Le
(74) *Attorney, Agent, or Firm* — Fish & Richardson P.C.

(57) ABSTRACT

Methods, systems, and apparatus, including computer program products, for generating visual media search results are provided. A first visual media search query in a first language is received. One or more bilingual refinements are identified for the first visual media search query. Each bilingual refinement associates an initial query in the first language and a subsequent query in a different second language. The initial query is equivalent to the first visual media search query. The subsequent query is a translation of the initial query in the second language. The subsequent query followed the initial query in a series of queries received from a user in a session. A first bilingual refinement is selected from the one or more bilingual refinements according to a first criterion. A set of visual media search results is generated based on the first search query and the selected first bilingual refinement's associated subsequent search query.

20 Claims, 8 Drawing Sheets

(56) References Cited

U.S. PATENT DOCUMENTS

| | | | |
|---|---|---|---|
| 7,698,331 B2 | 4/2010 | Carson et al. | |
| 7,720,856 B2* | 5/2010 | Goedecke et al. | 707/759 |
| 7,752,032 B2 | 7/2010 | Izuha | |
| 7,773,800 B2 | 8/2010 | Liu | |
| 7,783,633 B2 | 8/2010 | Florian et al. | |
| 7,813,917 B2 | 10/2010 | Shuster | |
| 7,818,314 B2 | 10/2010 | Chowdhury et al. | |
| 7,917,488 B2* | 3/2011 | Niu et al. | 707/706 |
| 7,991,608 B2* | 8/2011 | Johnson et al. | 704/9 |
| 8,024,337 B1 | 9/2011 | Baluja et al. | |
| 8,051,061 B2 | 11/2011 | Niu et al. | |
| 8,065,296 B1 | 11/2011 | Franz et al. | |
| 8,171,041 B2 | 5/2012 | Bennett | |
| 8,209,330 B1 | 6/2012 | Covell et al. | |
| 8,244,720 B2 | 8/2012 | Bihun et al. | |
| 8,364,462 B2* | 1/2013 | Joy et al. | 704/2 |
| 8,457,416 B2 | 6/2013 | Liu et al. | |
| 2001/0021934 A1* | 9/2001 | Yokoi | 707/500 |
| 2001/0029455 A1* | 10/2001 | Chin et al. | 704/277 |
| 2002/0097914 A1 | 7/2002 | Yaung | |
| 2002/0123982 A1 | 9/2002 | Masuichi | |
| 2002/0156763 A1 | 10/2002 | Marchisio | |
| 2002/0164075 A1 | 11/2002 | Acharya et al. | |
| 2002/0184206 A1* | 12/2002 | Evans | 707/4 |
| 2003/0035595 A1 | 2/2003 | Liu | |
| 2003/0050923 A1 | 3/2003 | Chang et al. | |
| 2003/0149686 A1 | 8/2003 | Drissi et al. | |
| 2003/0200079 A1* | 10/2003 | Sakai | 704/8 |
| 2004/0006560 A1* | 1/2004 | Chan et al. | 707/3 |
| 2004/0261021 A1* | 12/2004 | Mittal et al. | 715/517 |
| 2005/0060311 A1 | 3/2005 | Tong et al. | |
| 2005/0234898 A1 | 10/2005 | Drissi et al. | |
| 2005/0267734 A1 | 12/2005 | Masuyama | |
| 2006/0129915 A1 | 6/2006 | Chan | |
| 2006/0173839 A1 | 8/2006 | Knepper et al. | |
| 2006/0173886 A1 | 8/2006 | Moulinier et al. | |
| 2006/0217954 A1 | 9/2006 | Koyama et al. | |
| 2006/0230022 A1* | 10/2006 | Bailey et al. | 707/3 |
| 2006/0230035 A1 | 10/2006 | Bailey et al. | |
| 2006/0241934 A1 | 10/2006 | Izuha | |
| 2006/0271350 A1 | 11/2006 | Chino et al. | |
| 2007/0106653 A1 | 5/2007 | Sun | |
| 2007/0250494 A1* | 10/2007 | Peoples et al. | 707/4 |
| 2007/0276820 A1 | 11/2007 | Iqbal | |
| 2008/0015843 A1 | 1/2008 | Barghout | |
| 2008/0104045 A1 | 5/2008 | Cohen et al. | |
| 2008/0183685 A1 | 7/2008 | He et al. | |
| 2008/0189257 A1 | 8/2008 | Wiseman et al. | |
| 2008/0288474 A1* | 11/2008 | Chin et al. | 707/4 |
| 2008/0300854 A1 | 12/2008 | Eibye | |
| 2008/0306729 A1 | 12/2008 | Drissi et al. | |
| 2008/0306923 A1 | 12/2008 | Drissi et al. | |
| 2009/0024613 A1 | 1/2009 | Niu et al. | |
| 2009/0063455 A1 | 3/2009 | Li et al. | |
| 2009/0070318 A1 | 3/2009 | Song et al. | |
| 2009/0074306 A1 | 3/2009 | Liu et al. | |
| 2009/0076800 A1 | 3/2009 | Li et al. | |
| 2009/0083243 A1* | 3/2009 | Heymans et al. | 707/4 |
| 2009/0089332 A1* | 4/2009 | Harger et al. | 707/104.1 |
| 2009/0125497 A1* | 5/2009 | Jiang et al. | 707/4 |
| 2009/0132233 A1 | 5/2009 | Etzioni et al. | |
| 2009/0182547 A1 | 7/2009 | Niu et al. | |
| 2009/0222437 A1* | 9/2009 | Niu et al. | 707/5 |
| 2009/0326914 A1* | 12/2009 | Joy et al. | 704/3 |
| 2010/0070662 A1 | 3/2010 | Odenwald et al. | |
| 2010/0161642 A1* | 6/2010 | Chen et al. | 707/759 |
| 2010/0198837 A1 | 8/2010 | Wu et al. | |
| 2011/0055189 A1 | 3/2011 | Effrat et al. | |

OTHER PUBLICATIONS

Chen et al, "Multilingual Information Retrieval Using Machine Translation, Relevance Feedback and Decompounding", Kluwer Academic Publishers, Netherlands, 2004.*

Douglas W. Oard, "Interactive Cross-Language Information Retrieval", 2001.*

Gey et al, "Cross Language Information Retrieval: A Research Roadmap", SIGIR, 2002.*

Gey et al, "New Directions in Multilingual Information Access", SIGIR, 2006.*

He et al, "Studying the Use of Interactive Multilingual Information Retrieval", ACM, 2006.*

Kuraran et al, "On Pushing Multilingual Query Operators into Relational Engines", Database Systems Laboratory, India, 2006.*

Lu et al, "Analysis of the Bilingual Queries of a Chinese Web Search Engine", Hong Kong, 2006.*

Parton et al, "Simultaneous Multilingual Search for Translingual Information Retrieval", ACM, 2008.*

Aljlayl, Mohammed et al., "On Arabic-English Cross-Language Information Retrieval: *A Machine Translation Approach*", Information Retrieval Laboratory [online] Illinois Institute of Technology [retrieved on Jun. 2, 2009]. Retrieved from: http://www.ir.iit.edu/publications/downloads/073_aljlayl_m.pdf.

Cross Language Information Retrieval, Moustafa A. Youssef , Apr. 2001 [online] Department of Computer Science, University of Maryland [retrieved on Jun. 2, 2009]. Retrieved from: http://www.otal.umd.edu/UUPractice/clir/.

Etzioni, Oren et al. "Lexical Translation with Application to Image Search on the Web", Turing Center [online], Dept. of Computer Science and Engineering, University of Washington [retrieved on Jun. 2, 2009]. Retrieved from: http://turing.cs.washington.edu/papers/EtzioniMTSummit07.pdf.

Google Search Appliance 6.0, "Access all of your business content through one search box". Datasheet [online], [retrieved on Jun. 2, 2009]. Retrieved from: http://www.google.com/url?sa=t&source=web&ct=res&cd=1&url=http%3A%2F%2Fwww.google.com%2Fenterprise%2Fpdf%2Fgsa_datasheet.pdf&ei=vH33SbriKKPFtgfA_eCiDw&usg=AFQjCNE_skaQmDwohxU9IIdeQ6DfkzdL.1w.

Translated Search—Google Translate, [online], [retrieved on Jun. 2, 2009]. Retrieved from: http://translate.google.com/translate_s?hl=en.

History of Yandex, [online], [retrieved on Jun. 2, 2009]. Retrieved from: http://company.yandex.com/general_info/history,xml.

Example of image search, Yandex close up, ЯНДЕКС [online], [retrieved on May 5, 2009] Retrieved from: http://images.yandex.ru.

Example of image search, Yandex search results, ЯНДЕКС [online], [retrieved on May 5, 2009] Retrieved from: http://images.yandex.ru.

PanImages Image Search Tool Speaks Hundreds of Languages~Tech News Watch, Lockergnome, Sep. 12, 2007, [online], [retrieved on Jun. 2, 2009]. Retrieved from: http://www.lockergnome.com/news/2007/09/12/panimages-image-search-tool-speaks-hundreds-of-languages/.

Gao, W., et al. "Cross-Lingual Query Suggestion Using Query Logs of Different Languages", The Chinese University of Hong Kong, ACM, 2007.

Hu, R. et al. "Mining Translation of Web Queries from Web Clickthrough Data", Department of Computer Science, Huazhong University of Science and Technology, China, 2008.

Access all of your business content through one search box. Datasheet [online] Google Search Appliance 6.0 [retrieved on Jun. 2, 2009]. Retrieved from: 2Fgsa_datasheet.pdf&ei=vH33SbriKKPFtgfA_eCiDw&usg=AFQjCNE_skaQmDwohxU9IIdeQ6DfkzdL1w, 7 pages.

Google translate, 'Translated Search' [online], [retrieved on Jun. 2, 2009]. Retrieved from: http://translate.google.com/translate_s?hl=en, 1 Page.

Example of image search, Yandex close up, ЯНДЕКС [online], [retrieved on May 5, 2009] Retrieved from: http://images.yandex.ru, 1 Page.

Lockergnome, 'PanImages Image Search Tool Speaks Hundreds of Languages', Sep. 12, 2007, [online] 1996-2009 Tech News Watch and Lockergnome [retrieved on Jun. 2, 2009]. Retrieved from: http://www.lockergnome.com/news/2007/09/12/panimages-image-search-tool-speaks-hundreds-languages/, 5 Pages.

(56) References Cited

OTHER PUBLICATIONS

Youssef, Moustafa A., 'Cross Language Information Retrieval', Apr. 2001 [online] Department of Computer Science, University of Maryland [retrieved on Jun. 2, 2009]. Retrieved from: http://www.otal.umd.edu/UUPractice/cifil, 6 pp.

Kimura, et al., "Cross-Language Information Retrieval Based on Category Matching Between Language Versions of a Web Directory", Japan, 2003.

Maeda, et al., "Query Term Disambiguation for Web Cross-Language Information Retrieval using a Search Engine", ACM, 2000.

Clough, et al, "User Experiments With the Eurovision Cross-Language Image Retrieval System", Sheffield University, 2006.

Clough, et al, "The CLEF 2005 Cross-Language Image Retrieval Track", Sheffield University, UK, 2005.

Ambati, et al, "Using Monolingual Clickthrough Data to Build Cross-lingual Search System", ACM, 2006.

Sanderson, et al, "Measuring a cross language image retrieval system", Sheffield University, UK, 2004.

Jones, Gareth, "New Challenges for Cross-Language Information Retrieval: multimedia data and user experience", Cross-Language Evaluation Forum Workshop, Portugal, 2000.

Office Action issued in U.S. Appl. No. 12/481,421, filed May 23, 2011, 15 pages.

Office Action issued in U.S. Appl. No. 12/481,454, filed Jun. 8, 2011, 27 pages.

Office Action issued in U.S. Appl. No. 12/477,577, filed Sep. 1, 2011, 17 pages.

Notice of Allowance issued in U.S. Appl. No. 12/481,421, filed Jan. 9, 2012, 10 pages.

Notice of Allowance issued in U.S. Appl. No. 12/481,454, filed Jan. 25, 2012, 9 pages.

Office Action issued in U.S. Appl. No. 12/477,577, filed Mar. 13, 2012, 15 pages.

Notice of Allowance issued in U.S. Appl. No. 12/481,454, filed Mar. 21, 2012, 11 pages.

Notice of Allowance issued in U.S. Appl. No. 12/481,421, filed Apr. 2, 2012, 10 pages.

Office Action issued in U.S. Appl. No. 12/481,454, filed Apr. 26, 2012, 16 pages.

Office Action issued in U.S. Appl. No. 12/481,421, filed Jul. 11, 2012, 11 pages.

Office Action issued in U.S. Appl. No. 12/481,421, filed Oct. 29, 2012, 18 pages.

Office Action issued in U.S. Appl. No. 12/481,454, filed Oct. 29, 2012, 16 pages.

Office Action issued in U.S. Appl. No. 12/477,577, filed Mar. 7, 2013, 22 pages.

Notice of Allowance issued in U.S. Appl. No. 12/481,421, filed Apr. 24, 2013, 15 pages.

Notice of Allowance issued in U.S. Appl. No. 12/481,454, filed Jun. 14, 2013, 13 pages.

Notice of Allowance issued in U.S. Appl. No. 12/477,577, filed Jun. 24, 2013, 33 pages.

\* cited by examiner

US 8,577,909 B1

QUERY TRANSLATION USING BILINGUAL SEARCH REFINEMENTS

CROSS-REFERENCE TO RELATED APPLICATIONS

This application claims priority to U.S. Provisional Application Ser. No. 61/178,830, filed May 15, 2009, the entire disclosure of which is incorporated herein by reference.

BACKGROUND

This invention relates to increasing the number of visual media search results generated in response to a visual media search query.

FIG. 1A illustrates an example conventional approach—an example user interface for a search engine where a user has entered a visual media search query in one language (Greek) and the search engine has generated associated results in that language. In general, a search engine is a program that receives a search query from a user and returns one or more search results that satisfy the search query. In general, a visual media search is a word-based search for visual media. The visual media search query is the word or words on which the search is based. Visual media includes, for example, images, video, images embedded in files, video embedded in files, and interactive media such as javascript or actionscript games.

In FIG. 1A, the visual media search query is σκιέρ 102. σκιέρ is the Greek word for skier. In response to receipt of the visual media search query, a search is performed, one matching result 104 is identified, and this one matching result 104 is presented to the user through the user interface.

SUMMARY

In general, one aspect of the subject matter described in this specification can be embodied in methods that include the following. A first visual media search query in a first language is received. One or more bilingual refinements are identified for the first visual media search query. Each bilingual refinement associates an initial query in the first language and a subsequent query in a different second language. The initial query is equivalent to the first visual media search query. The subsequent query is a translation of the initial query in the second language. The subsequent query followed the initial query in a series of queries received from a user in a session. A first bilingual refinement is selected from the one or more bilingual refinements according to a first criterion. A set of one or more visual media search results is generated based on the first search query and the selected first bilingual refinement's associated subsequent search query. Other implementations of this invention include corresponding systems, apparatus, computer program products, and computer readable media.

These and other implementations can optionally include one or more of the following features. The initial query can be identical to the first visual media search query. The first criterion can include selecting a most frequently appearing bilingual refinement in the one or more bilingual refinements. The subsequent query can follow the initial query in the series of queries within a threshold.

A set of one or more visual media search results can be presented.

A second bilingual refinement can be selected from the one or more bilingual refinements according to a second criterion. The set of visual media search results can be further based on the subsequent query associated with the second bilingual refinement. The second criterion can include selecting a second most frequently appearing bilingual refinement in the one or more bilingual refinements.

The visual media can be an image, a video, an image embedded in a file, or a video embedded in a file.

Particular embodiments of the subject matter described in this specification can be implemented to realize one or more of the following advantages. A larger set of relevant visual media search results can be provided in response to a visual media search query. A set of visual media search results that are more responsive to a given visual media search query can be provided in response to the visual media search query. Search results relevant to a local concept can be returned even if the user searches in a language different from the local language.

The details of one or more implementations of the invention are set forth in the accompanying drawings and the description below. Other features, objects, and advantages of the invention will be apparent from the description and drawings, and from the claims.

DETAILED DESCRIPTION

Figure 1A:
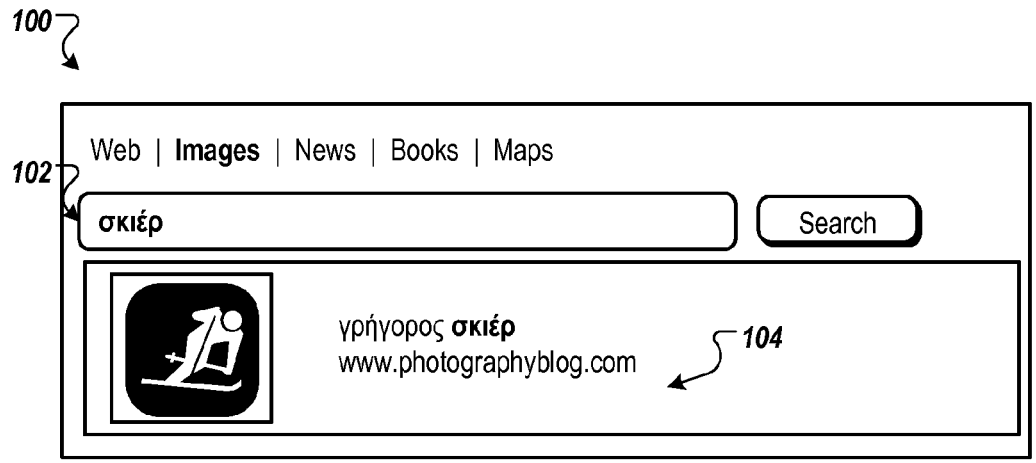
FIG. 1A illustrates an example of a conventional approach featuring an image search query in one language and associated results in that language.

The small set of search results shown in FIG. 1A can be disappointing to a user. There are many reasons a set of search results can be small, including an unusual topic or a misspelled search query. However, in many cases, the set of search results is small because of the language the user is searching in. Some concepts are more popular in certain languages. For example when discussing the Golden Gate Bridge in San Francisco, Calif., people are more likely to use English than Dutch, because the Golden Gate Bridge is a United States' landmark, and the English phrase is how the bridge is named in the United States. If a user has entered a search query in a language where the search query is not a popular concept, few results may be returned. This is true even though the search query concept may be very popular in other languages and, if the user entered a visual media search query in one of those other languages, he or she would be presented with a larger number of search results.

Figure 1B:
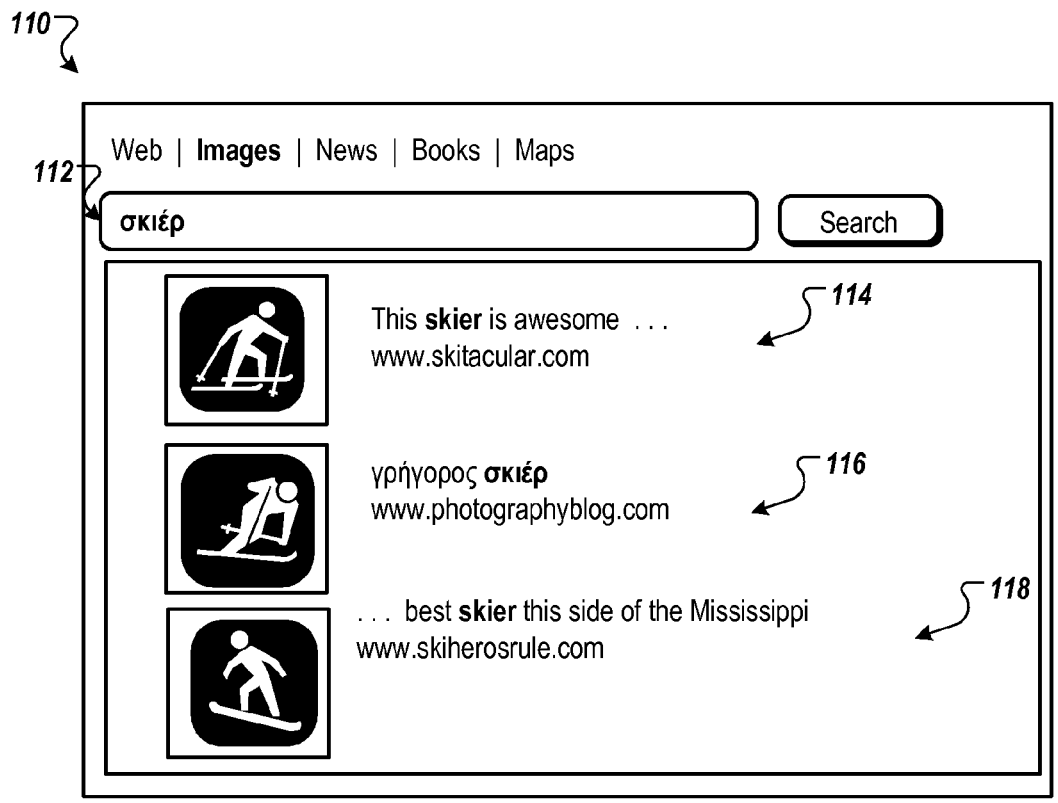
FIG. 1B illustrates an example image search query in one language and associated results in that language and a second language.

FIG. 1B illustrates an example user interface for a search engine where a user has entered a visual media search query in one language (Greek) and the search engine has generated associated results in two languages (Greek and English). The use of English in addition to Greek is determined by examining bilingual refinements. In general, a bilingual refinement occurs when a user searches for a phrase in one language and then, in the same session, searches for the translation of the phrase in a second, different, language. From this pattern, a conclusion can be drawn that the user believed that better search results might be obtained by searching in the second language. Two languages can be different when they are distinct languages, for example, English and French, or when they are different dialects of the same language. Bilingual refinements can be identified from any type of search queries, not just visual media search queries.

In general, a session is a period during which a user is performing searches. A session can be measured in a number of ways including, for example, by a specified period of time (for example, thirty minutes), by a specified number of queries (for example, 15 queries), until a specified period of inactivity (for example, 10 minutes without performing a search), or while a user is logged-in to a system.

In FIG. 1B, the user has entered the visual media search query σκιέρ 112, meaning skier in Greek. A bilingual refinement is selected from one or more bilingual refinements corresponding to the search query σκιέρ 112. The bilingual refinement can be selected according to various criteria including, for example, selecting the most frequently occurring bilingual refinement in a set of one or more bilingual refinements corresponding to the visual media search query. Here, a bilingual refinement from "σκιέρ" to "skier" is selected. A search is performed using both "σκιέρ" and "skier". The result is a more robust set of search results. The result from FIG. 1A 116 is again presented, but two additional results in English 114 and 118 are also presented.

Thus, if a visual media search query is augmented with its translation into a second relevant language, for example, through examining bilingual refinements, the user can be provided with additional search results. Because visual media typically involves image and video content which conveys information independent of language, the user is likely less concerned with the language of the search result and more concerned with the content of the visual media. Therefore, visual media search queries are an especially fruitful area for query translation. However, similar techniques could be used in any other type of search, for example, documents searches.

Visual media is not limited to images. For example, visual media can include video, images embedded in an electronic file, video embedded in an electronic file, and interactive media such as javascript or actionscript games. Visual media does not necessarily correspond to an electronic file. Visual media can be stored in a portion of a file that holds other documents, in a single file dedicated to the visual media in question, or in multiple coordinated files. Moreover, visual media can be stored in memory without first having been stored in a file.

The search query does not have to be received from a user; instead, it can be received from any source, including, for example, a computer or a process on a computer. The search query does not have to be received through a search engine user interface, but can be received through any interface that allows a user, a computer, or a process to send a search query.

Presenting search results is not limited to causing visual media to be presented to the user. Presenting search results can include, for example, displaying search results on a display device, transmitting search results to a user's computer for presentation to the user, transmitting search results to another device, transmitting sounds corresponding to the search results, providing haptic feedback corresponding to the search results, or transmitting signals comprising haptic feedback corresponding to the search results to a user's computer for presentation to the user. Other methods of presenting search results are possible.

Figure 2:
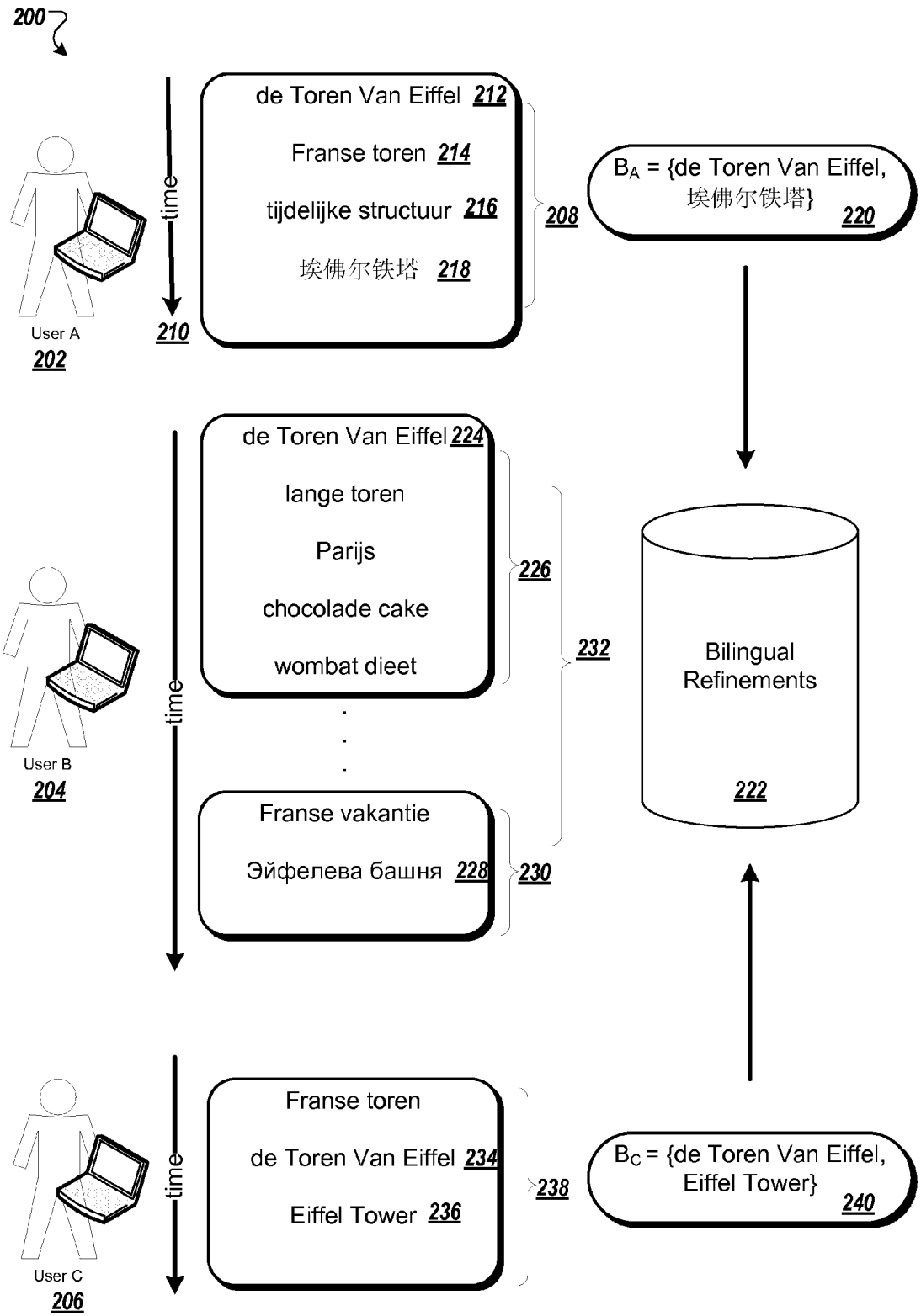
FIG. 2 illustrates example bilingual refinements.

FIG. 2 illustrates example bilingual refinements in various implementations. Three users, user A 202, user B 204, and user C 206 input a series of search queries, 208, 232, and 238, respectively. Each series of search queries, 208, 232, and 238 consist of one or more queries entered by the corresponding user over a period of time.

User A 202 begins by searching for "de Toren Van Eiffel" 212. This is Dutch for the Eiffel Tower. As time 210 continues, user A 202 searches for "Franse toren" 214. "De Toren Van Eiffel," does not translate to "Franse toren," and thus {de Toren Van Eiffel, Franse toren} is not a bilingual refinement. The user next searches for "tijdelijke structuur" 216. "De Toren Van Eiffel" does not translate to "tijdelijke structuur," and thus {de Toren Van Eiffel, tijdelijke structuur} is not a bilingual refinement. Furthermore, "Franse toren" does not translate to "tijdelijke structuur," and thus {Franse toren, tijdelijke structuur} is also not a bilingual refinement. Finally, user A searches for "埃佛尔铁塔" 218. "De Toren Van Eiffel" does translate to "埃佛尔铁塔," and thus {de Toren Van Eiffel, 埃佛尔铁塔} is identified as a bilingual refinement 220 corresponding to "De Toren Van Eiffel," and stored in a collection of bilingual refinements 222.

In some implementations, the translation from the initial query to the subsequent query does not have to be an identical translation. For example, approximate translations, such as approximate translations that use slang words or synonyms, or approximate translations that add or leave off stop words (e.g., known terms that do not contribute to the topicality of the query such as "a" or "the") can be sufficient.

User B 204 begins by searching for "de Toren Van Eiffel" 224. User B then proceeds to search for a number of queries that do not translate to "de Toren Van Eiffel" or to each other. These queries 226 are all part of a first session. At some point in time, user B's first session ends. Because none of the queries 226 entered by user B 204 in his first session translate to each other, no bilingual refinements are identified from the first session. At a later point in time, user B begins a second session in which he searches for two queries 230 including "Эйфелева башня" 228. "De Toren Van Eiffel" is a translation of "Эйфелева башня." If the queries "De Toren Van Eiffel" and "Эйфелева башня" had been entered in the same session, they would be considered a bilingual refinement corresponding to De Toren Van Eiffel. However, because "de Toren Van Eiffel" 224 was entered in user B 204's first session and "Эйфелева башня" 228 was entered in user B 204's second session, the two queries are not considered a bilingual refinement. Thus, no bilingual refinements are identified from either of user B's sessions.

In some implementations, even queries that translate to each other and are received during the same session are not considered a bilingual refinement if they do not occur within a specified threshold. A threshold is a estimate of an acceptable distance that can separate two queries and still result in the queries being considered a bilingual refinement. For example, a threshold can be a number of queries (e.g., 5) or a period of time, (e.g., 5 minutes). Other measures of an acceptable distance that can separate two queries and still result in the queries being considered a bilingual refinement are possible. The threshold can be chosen to include all queries in a session or be chosen to include a subset of queries in a session.

User C 206 searches for three queries 238. During his session, user C searches for "de Toren Van Eiffel" 234 followed by "Eiffel Tower" 236. "De Toren Van Eiffel" is a translation of "Eiffel Tower," and thus {de Toren Van Eiffel, Eiffel Tower} is identified as a bilingual refinement 240 corresponding to "de Toren Van Eiffel," and stored in the collection of bilingual refinements 222.

Bilingual refinements can be identified in a number of ways. In various implementations, bilingual refinements are identified from stored user search histories corresponding to a series of search queries received from a user in a session. In some implementations, search queries are considered as they are received from a user to identify bilingual refinements. In some implementations, bilingual refinements that correspond to one or more potential visual media search queries are identified in advance and stored until they are needed. In some implementations, bilingual refinements are identified on-the-fly in response to a user's visual media search query.

Figure 3:
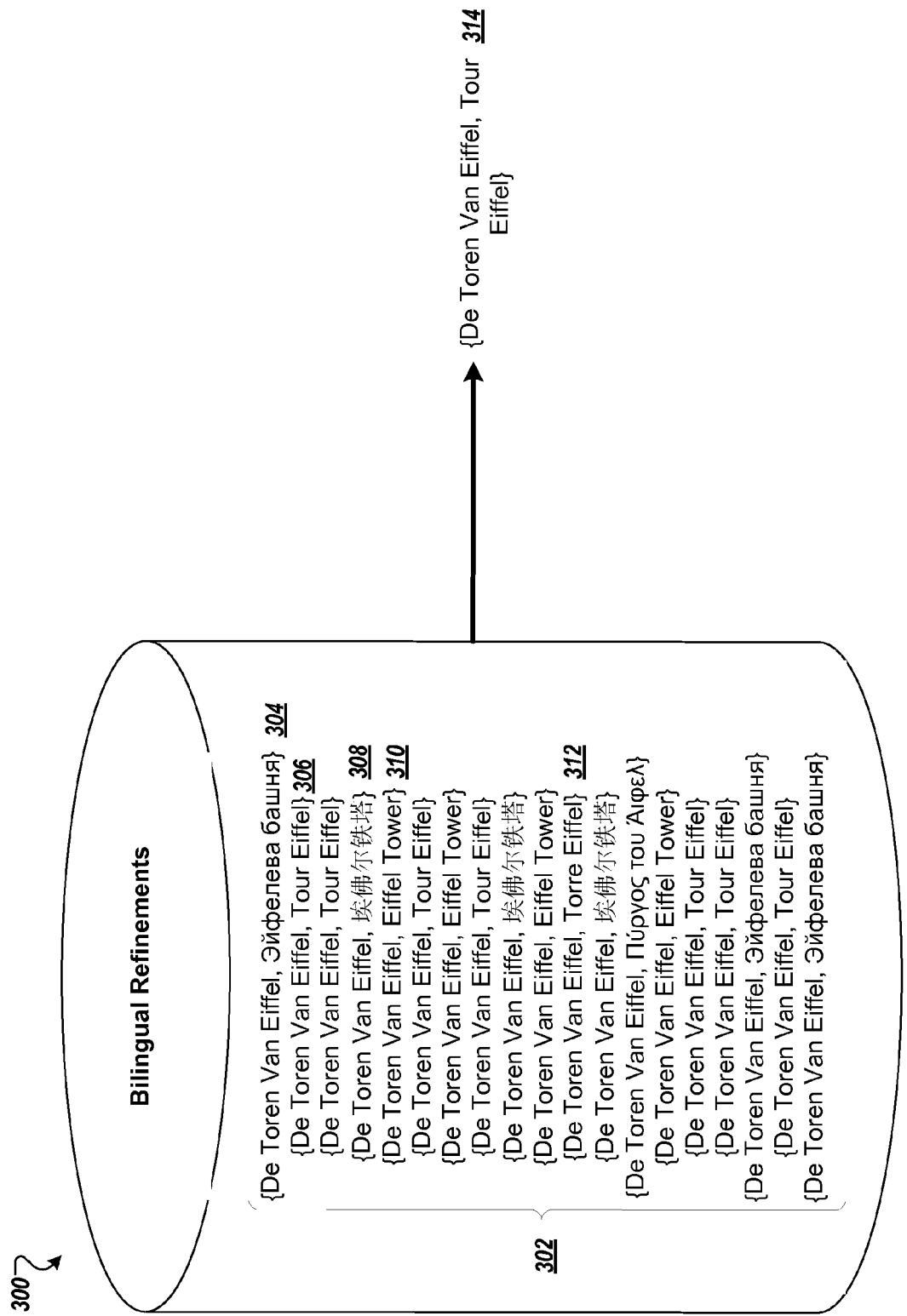
FIG. 3 illustrates an example of how a bilingual refinement is selected from a set of identified bilingual refinements.

FIG. 3 illustrates an example of how a bilingual refinement is selected from a collection of identified bilingual refinements.

A collection of identified bilingual refinements 302 corresponding to "De Toren Van Eiffel," Dutch for "the Eiffel tower," is shown. These bilingual refinements include translations into a number of languages such as Russian 304, French 306, Chinese 308, English 310, Portuguese 312, and others. Some of the bilingual refinements appear more than once.

The various bilingual refinements are repeated in the collection of bilingual refinements different numbers of times. For example, {De Toren Van Eiffel, Эйфелсва башня} appears three times and {De Toren Van Eiffel, Eifel Tower} appears four times. One way of selecting a bilingual refinement is to select the most frequently appearing bilingual refinement in the collection of identified bilingual refinements. For example, here, the most frequently appearing refinement is {De Toren Van Eiffel, Tour Eiffel}, which appears seven times. Because {De Toren Van Eiffel, Tour Eiffel} appears more than any other bilingual refinement in the collection of bilingual refinements, it is selected as the bilingual refinement 314 corresponding to "De Toren Van Eiffel."

In alternative implementations, different criteria can be used to select a bilingual refinement. These criteria include, for example, selecting the most recently observed bilingual refinement in the collection of identified bilingual refinements, selecting the least frequently appearing bilingual refinement in the collection of identified bilingual refinements, selecting the best bilingual refinement in the collection of identified bilingual refinements, chosen according to a subjective standard, or selecting a bilingual refinement at random from the collection of identified bilingual refinements. Other criteria for selecting a bilingual refinement can also be used.

Figure 4:
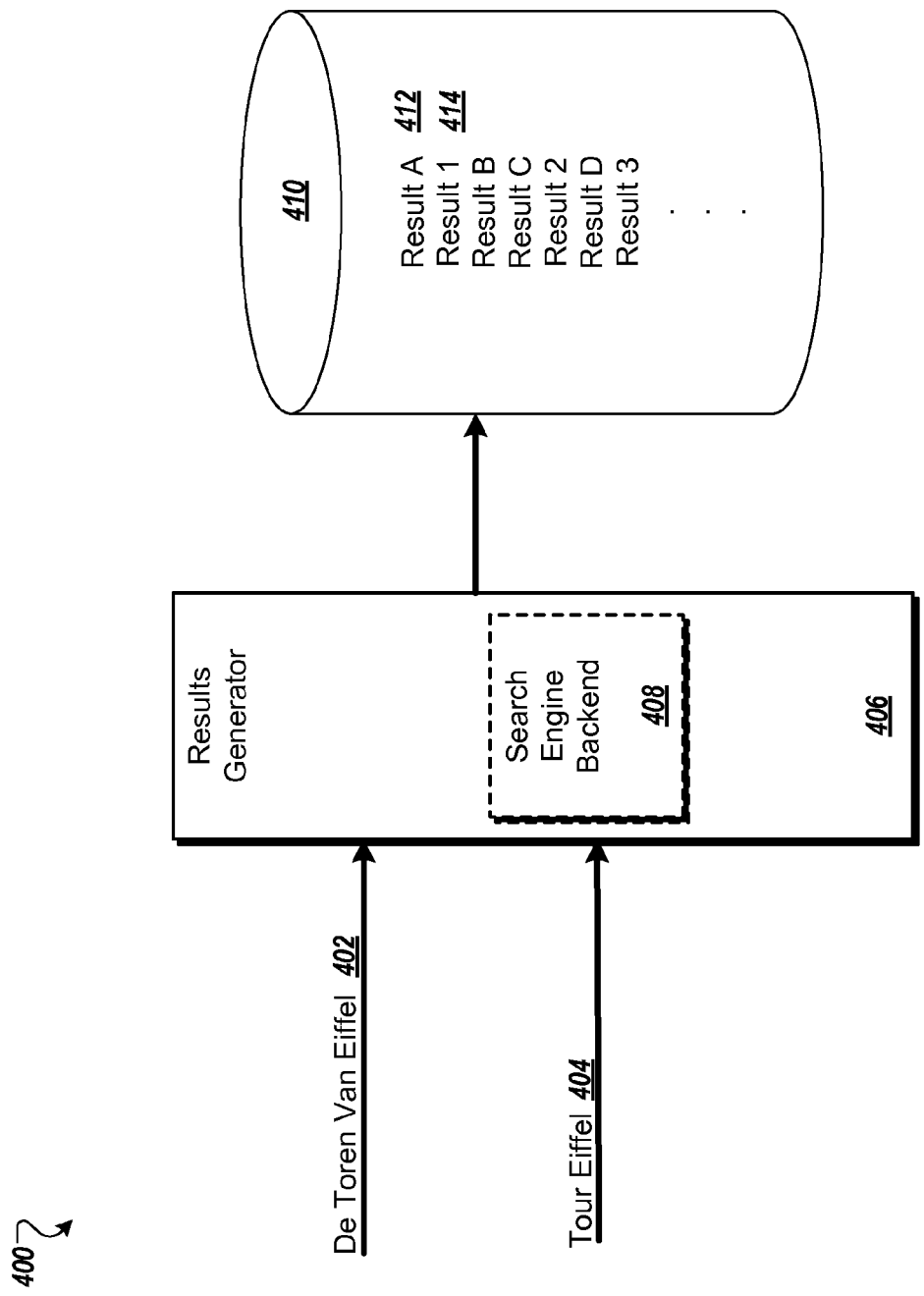
FIG. 4 illustrates an example of how search results are generated using a visual media search query and a selected bilingual refinement.

FIG. 4 illustrates an example of how search results are generated using a search query and a translation of the search query.

Once a query 402 has been received and a translation of the query corresponding to a selected bilingual refinement 404 has been selected, the two queries are passed to a results generator 406. The results generator 406 applies the query 402 and its translation 404 to one or more corpora of documents, resulting in a set of results 410. A corpus of documents is a collection of documents, visual media, and other information.

The set of results may include results in the language of the query, e.g. Result A 412, and may also include results in the language of the translation, e.g. Result 1 414. In FIG. 4, Results A, B, C, and D correspond to results with Dutch phrases (corresponding to "De Toren Van Eiffel") and Results 1, 2, and 3 correspond to results with French phrases (corresponding to "Tour Eiffel"). Results can include phrases in more than one language. In some implementations, a result with a phrase satisfying the search query or its translation is returned even if other parts of the result are in a different language.

The results can be generated in a number of ways. In various implementations, the results generator 406 combines the query and its translation into one query that searches for both queries with equal weight. For example, the combined query in FIG. 4 might be "'De Toren Van Eiffel' or 'Tour Eiffel.'" The combined query is then passed to a search engine backend 408 that generates the set of search results 410. In some implementations, the results generator combines the two queries into one query, but gives the two queries differing weights, for example, weighting the translated query using a quality of result statistic for the translated query as discussed in U.S. patent application Ser. No. 12/481,421, for "Query Translation Quality Confidence," incorporated by reference. In some implementations, the results generator 406 uses the search engine backend 408 to run two searches: one corresponding to the query and one corresponding to its translation. The results generator then combines the resulting sets of results, for example, by alternating results from the two sets of results, considering scores associated with the results, or estimating the relevance of the results.

The search engine backend can be part of the results generator, a separate process run on the same computer as the results generator, or a separate process run on a different computer.

Other methods of generating a set of search results responsive to a query and its translation are possible.

Figure 5:
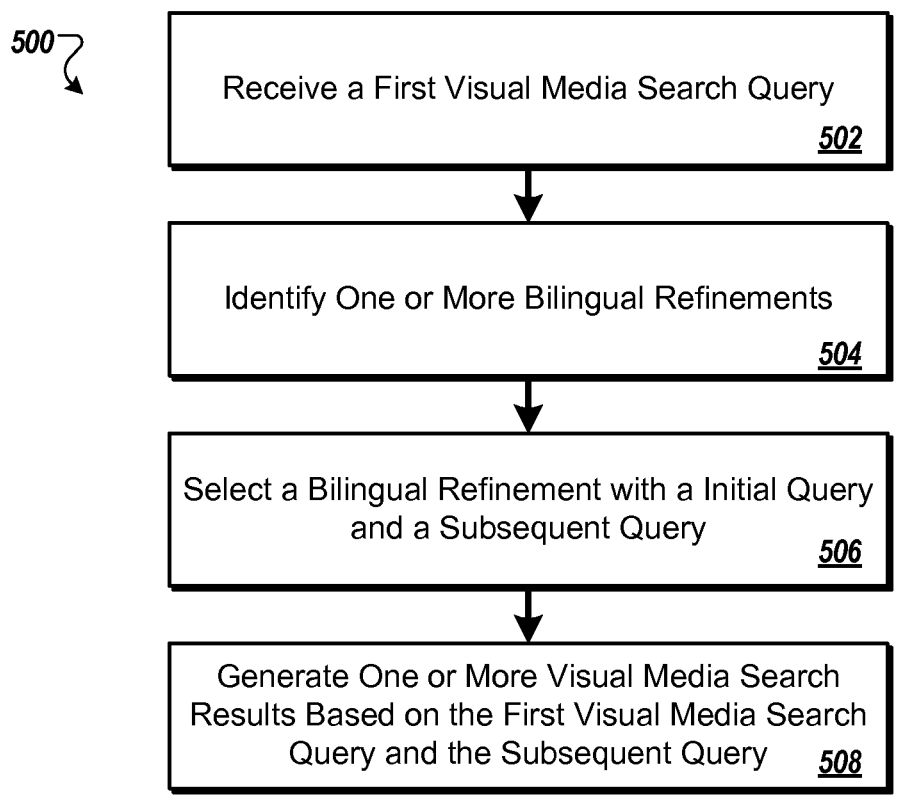
FIG. 5 illustrates an example technique for performing a visual media search based on a query and a bilingual refinement of the query.

FIG. 5 illustrates an example technique 500 for performing a visual media search based on a query and a bilingual refinement of the query. This technique can be performed by, for example, a search engine provider using one or more computers. A search engine provider provides search services, for example to users or to computer processes.

In step 502, a visual media search query is received (e.g., by a search engine provider). A visual media search query is a word or words defining a search for visual media. Any method of receiving a search query can be used. For example, in various implementations, the visual media search query is received from a user's computer through a web interface. The web interface can be, for example, a webpage, run by a search engine provider, that receives search queries from a user and presents results and other information relevant to the search query to the user. In some implementations, the visual media search query is received from a process running on a computer of the search engine or a computer of a third party. In some implementations, the visual media search query is received from a computer.

In step 504, one or more bilingual refinements are identified (e.g., by a search engine provider). In general, each bilingual refinement associates an initial query in the first language and a subsequent query in a different second language. The initial query is equivalent to the visual media search query. The subsequent query followed the initial query in a series of queries received from a user in a session, and is a translation of the initial query in the second language. Examples of bilingual refinements are illustrated in FIG. 2.

In some implementations, two queries are equivalent when they are identical. In alternative implementations, two queries can be equivalent even though they are not identical. For example, two queries can be equivalent when they have the same meaning, despite small differences in spelling, small differences in word order, the use of abbreviations, the use of synonyms, or the use of stop words (e.g., known terms that do not contribute to the topicality of the query, such as "a" or "the"). Other common measures of similarity can also be used, for example, using the edit distance for the two queries.

In some implementations, the one or more bilingual refinements are identified in advance. In some implementations, all bilingual refinements that exist in the received series of user queries are identified in advance. In some implementations, only certain bilingual refinements are identified in advance, for example, only bilingual refinements that correspond to the most popular queries.

In various implementations, when one or more bilingual refinements are identified in advance, the identified bilingual refinements, or a representation of the identified bilingual refinements, can be stored for later access (e.g., by the search engine provider). In some implementations, the one or more identified bilingual refinements are stored, for example on one or more machine readable storage devices. The identified bilingual refinements do not have to be in a contiguous section on a machine readable storage device, nor do the identified bilingual refinement have to be completely stored on the same machine readable storage device. In some implementations, the identified bilingual refinements are stored in a bilingual refinement database that associates a given visual media search query with its corresponding identified bilingual refinements.

In some implementations, the one or more bilingual refinements are identified on-the-fly, in response to receiving the visual media search query. In some implementations, some bilingual refinements are identified in advance and some are identified on-the-fly in response to receiving the first visual media search query.

In some implementations, the one or more bilingual refinements are identified by searching one or more user search histories. A user search history stores a sequence of queries received from a user. User search histories may also include additional information such as which results were selected after a search was performed and how long each selected result was viewed. Each user search history can be searched for a query in one language followed, in the same session, by the translation of the query in a different language.

In some implementations, the one or more bilingual refinements are identified as a series of search queries is received from a user. In these implementations, the series of search queries is monitored in real time as each query is received, and bilingual refinements are identified as they are received.

Other methods of identifying bilingual refinements are possible.

In step 506, a bilingual refinement is selected from the one or more identified bilingual refinements (e.g., by a search engine provider). The bilingual refinement can be selected according to a criterion. A criterion specifies which bilingual refinement to select. For example, the criterion can specify one or more attributes the selected bilingual refinement should have, or can specify a method or algorithm for selecting the selected bilingual refinement. For example, the first criterion can specify that the most frequently appearing bilingual refinement should be selected. The most frequently appearing bilingual refinement can be determined, for example, through the process described in FIG. 3. Alternative criteria are possible, for example, a criterion specifying that the most recently identified bilingual refinement should be selected.

In some implementations, a bilingual refinement is selected in advance. When a bilingual refinement is selected in advance, the selected bilingual refinement, or a representation of the selected bilingual refinement, can be stored for later use, for example on one or more machine readable storage devices. The bilingual refinement does not have to be in a contiguous section on a machine readable storage device, nor does the bilingual refinement have to be completely stored on the same machine readable storage device. In alternative implementations, a bilingual refinement is selected on-the-fly, in response to receiving the visual media search query. In some implementations, once a bilingual refinement is selected on-the-fly, it is stored for later use much as a bilingual refinement selected in advance is stored for later use. In some implementations, the selected bilingual refinement is stored in a bilingual refinement database that associates a given visual media search query with its selected bilingual refinement or bilingual refinements.

In some implementations, more than one bilingual refinement is selected. In some implementations, additional bilingual refinements are selected according to the same or similar criteria as the first bilingual refinement, for example, selecting the first bilingual refinement by selecting the most frequently appearing refinement, and selecting a second bilingual refinement by selecting the second most frequently appearing bilingual refinement. In some implementations, the additional bilingual refinements are selected according to different criteria from the first bilingual refinement, for example, selecting the first bilingual refinement by selecting the most frequently appearing bilingual refinement, and selecting the second bilingual refinement at random.

In step 508, one or more visual media search results are generated based on the visual media search query and the translated query from the selected bilingual refinement (e.g., by a search engine provider). The search results can be generated in a number of ways, for example, as discussed above in regard to FIG. 4.

In some implementations, the search results are further based on the translated queries from additional selected bilingual refinements. In these implementations, the translated queries of the additional selected bilingual refinements are used much as the translated query from the first selected bilingual refinement is used.

Figure 6:
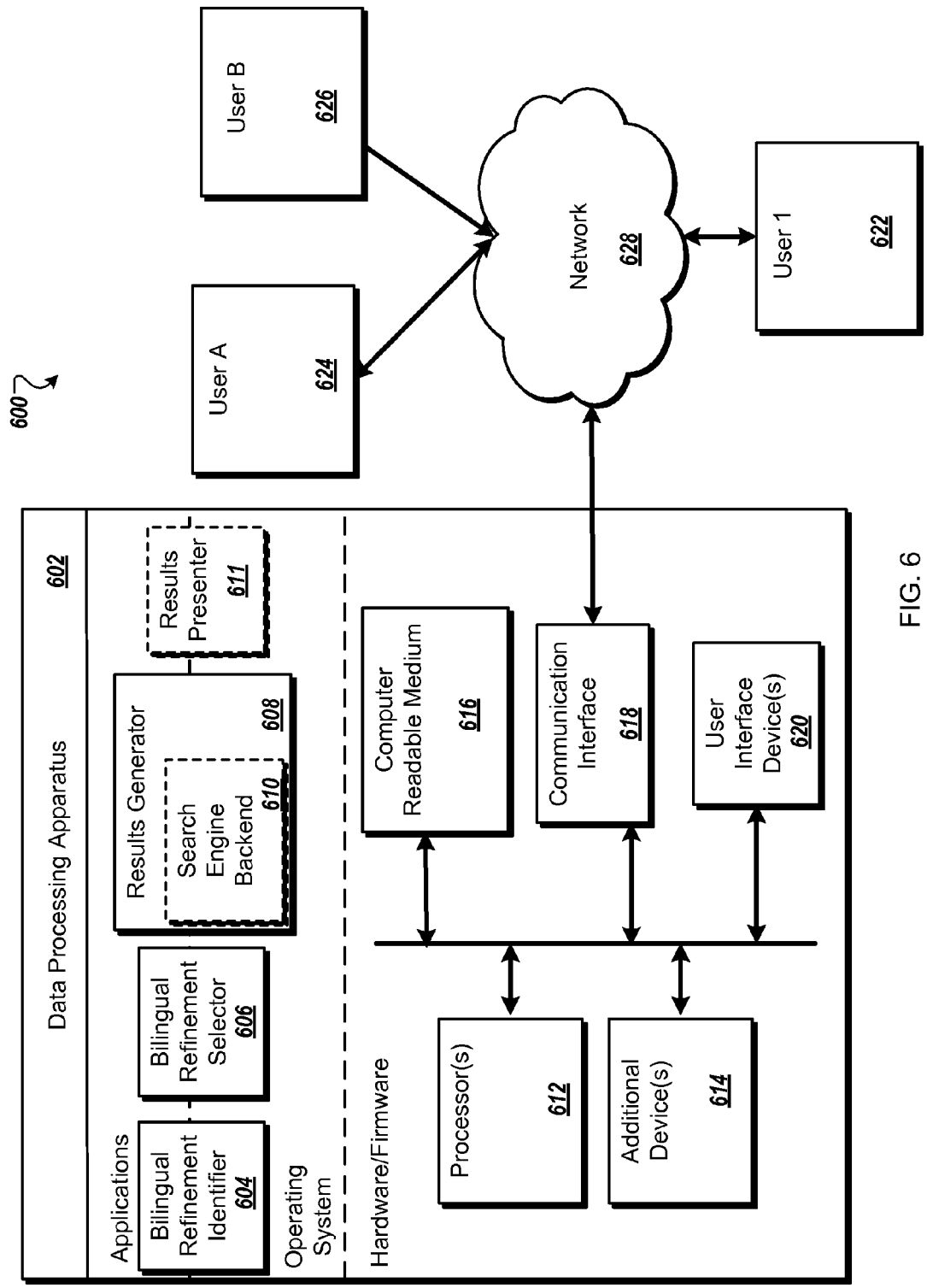
FIG. 6 illustrates an example architecture of a system.

FIG. 6 illustrates an example architecture of a system 600. The system generally consists of a server 602, one or more client computers 624 and 626 that send search queries to the server 602, and a client computer 622 used to submit a visual media search query to the server 602 and to receive visual media search results from the server 602. The computers are connected through a network 628.

While client computers 622, 624, and 626 are shown as separate computers, in some implementations they are the same computer. For example, a computer can be used to send search queries that are used to identify bilingual refinements and also be used to submit a visual medias search query that will be augmented using a selected bilingual refinement.

The server 602 is a data processing apparatus. While only one data processing apparatus is shown in FIG. 6, a plurality of data processing apparatus may be used.

In various implementations, the server 602 runs a number of processes, e.g. executable software programs. In various implementations, these processes include a bilingual refinement identifier process 604, a bilingual refinement selector process 606, a results generator process 608, and an optional search engine backend 610. Running a process includes, for example, instantiating a copy of the process, providing system resources to the process, and communicating with the process through a hardware or software interface. A hardware or software interface is an interface that allows processes to communicate with each other or with system hardware, for example, a system bus or commands specified in an application programming interface.

The bilingual refinement identifier process 604 identifies one or more bilingual refinements from a series of search queries submitted by a user. In various implementations, this includes searching one or more user search histories to identify bilingual refinements, either in advance or on-the-fly in response to a search query. In some implementations, the user search histories are stored on the server 602, for example, on the computer readable medium 616 or an additional device 614 such as a hard drive. In alternative implementations, the user search histories are stored on client computers 624 and 626. In these implementations, the bilingual refinement identifier process 604 accesses the search histories through, for example, the network 628. In some implementations, a series of search queries from a user is monitored in real time as each query is received from a client computer, and bilingual refinements are identified as they are received.

The bilingual refinement selector process 606 selects a bilingual refinement from the one or more bilingual refinements identified by the bilingual refinement identifier 604. In various implementations, this includes counting how many times each bilingual refinement appears in the set of one or more bilingual refinements and selecting the bilingual refinement that appears the most frequently. In alternative implementations, other methods of selecting a bilingual refinement can be used, for example, selecting the most recently identified bilingual refinement. The bilingual refinement selector can select a bilingual refinement corresponding to one or more search queries in advance, or on-the-fly in response to a visual media search query.

The results generator process 608 generates a set of search results responsive to a visual media search query and a selected bilingual refinement associating the visual media search query (or an equivalent query) and its translation into a different language. In various implementations, this includes combining the query and its translation into one query where the query and its translation are considered with equal weight or with different weights. The combined query is then passed to a search engine backend. In alternative implementations, the query and its translation are provided separately to a search engine backend resulting in two separate sets of sets results, and the results generator process 608 combines the resulting two sets of search results into one set of search results.

A search engine backend performs a search corresponding to a query over one or more corpora of documents and returns a set of search results. In various implementations, the search engine backend 610 is run on the server 602. In these implementations, the search engine backend 610 and the results generator process 608 communicate, for example, through a hardware or software interface. In some implementations, the search engine backend 610 and the results generator 608 are part of the same process. In some implementations, the search engine backend is run on another computer and queries and search results are sent, for example, over a network.

In some implementations, the server 602 also runs a results presenter process 611 that presents search results. In some implementations, the results presenter process 611 is part of the results generator process 608. Presenting search results can include, for example, displaying search results on a display device, transmitting search results to a user's computer 622 for presentation to the user, transmitting search results to another device, transmitting sounds corresponding to the search results, providing haptic feedback corresponding to the search results, or transmitting signals comprising haptic feedback corresponding to the search results to a user's computer 622 for presentation to the user. Other methods of presenting search results are possible.

In some implementations, the server 602 also stores identified or selected bilingual refinements. In some implementations, the identified or selected bilingual refinements are stored on a computer readable medium 616. In some implementations, the identified or selected bilingual refinements are stored on one or more additional devices 614, for example, a hard drive. In some implementations, a representation of the identified bilingual search refinements or a representation of the selected bilingual refinement is stored instead of or in addition to the bilingual refinements themselves. In some implementations, a bilingual refinement database is stored. The bilingual refinement database associates a given query with its corresponding identified bilingual refinement or its corresponding selected bilingual refinement, allowing the server to quickly access identified bilingual refinements or a selected bilingual refinement associated with a query in the database.

The server 602 also has hardware or firmware devices including one or more processors 612, one or more additional devices 614, computer readable medium 616, and one or more user interface devices 620. User interface devices 620 include, for example, a display, a camera, a speaker, a microphone, or a haptic feedback device.

The server 602 uses its communication interface 618 to communicate with a plurality of client computers 622, 624, and 626 through a network 628.

A plurality of client computers 624 and 626 are connected to the server 602 through the network 628. These client computers 624 and 626 are data processing apparatus. Users use these client computers 624 and 626 to submit search queries through the network to the server 602, for example, through a web-browser run on the client computer, for example, Firefox™ available from the Mozilla Project in Mountain View, Calif. The submitted search queries can be any type of search query, including visual media search queries and document search queries. Users submit queries to the server 602 during a session. In some implementations, a user search history is created corresponding to one or more sessions. The user search history stores the sequence of queries submitted by the user. The user search history may also include additional information such as which results were selected after a search was performed and how long each selected result was viewed. In some implementations, the user search history is stored on the client computer 624 or 626 (whichever one was used to submit the queries), for example on a computer readable medium or an external device such as a hard drive. In these implementations, the bilingual refinement identifier process 604 accesses the user search histories through the network 628. In alternative implementations, the user search history is stored on the server 602 while or after search queries are received from a user.

User 1 runs a client computer 622 that is a data processing apparatus. User 1 uses their computer 622 to submit a visual media search query through the network 628 to the server 602, for example, through a web-browser. User 1 also uses their computer to view search results responsive to the visual media search query he or she submitted. These search results are transmitted by the server 602 to the user 622 through the network 628. The user's computer may present the search results to the user, for example, by displaying the results on a display device, transmitting sound corresponding to the results, or providing haptic feedback corresponding to the results.

While the system 600 of FIG. 6 envisions a user who submits a visual media search query through their computer, the visual media search query does not have to be received from a user or a user's computer, but can be received from any data processing apparatus, process, or person, for example a computer or a process run on a computer, with or without direct user input. Similarly, the results do not have to be presented to the user's computer but can be presented to the data processing apparatus, process, or person that sent the visual media search query to the server.

Figure 7:
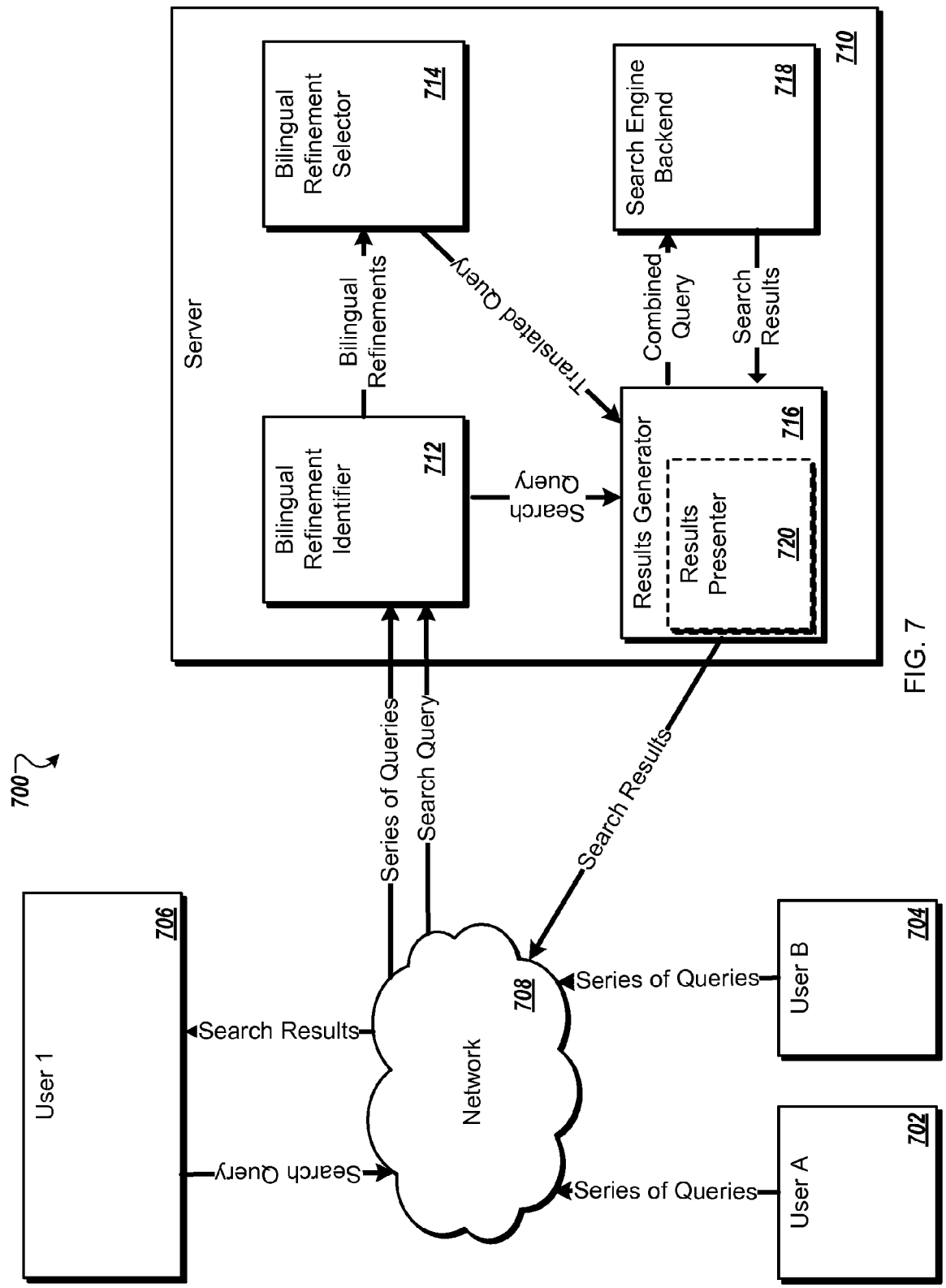
FIG. 7 illustrates example information flow through a system.

FIG. 7 illustrates example information flow through a system.

In various implementations, a series of search queries are sent from the computers 702 and 704 of user A and user B. Each series of search queries corresponds to a series of search queries entered by the respective user. The series of search queries are sent through a network 708 to a bilingual refinement identifier process 712 on server 710. In some implementations, the series of search queries are stored by the server 710 before, while, or after being provided to the bilingual refinement identifier.

In some implementations, the bilingual refinement identifier identifies one or more bilingual refinements from the search histories submitted by users A and B in advance, before a visual media search query is received from a user. In these implementations, the identified bilingual refinements, or a representation of identified bilingual refinements, corresponding to one or more possible search queries can be stored on the server 710 for later use or sent to the bilingual refinement selector 714. In some implementations, the identified bilingual refinements are stored in a bilingual refinement database that associates a given visual media search query with its corresponding one or more identified bilingual refinements.

In some implementations, the bilingual refinement selector selects a bilingual refinement from one or more bilingual refinements identified by the bilingual refinement identifier in advance, before a visual media search query is received from a user. In these implementations, the selected bilingual refinement, or a representation of the selected bilingual refinement, can be stored on the server 710 for later use. In some implementations, the selected bilingual refinement is stored in a bilingual refinement database that associates a given visual media search query with its selected bilingual refinement or bilingual refinements.

In various implementations, user 1 uses their computer 706 to send a visual media search query through the network 708 to the server 710. In alternative implementations, the visual media search query is received from a process running on a computer. In some implementations, the process is running on the server 710 and the visual media search query is received, for example, through a hardware or software interface. In alternative implementations, the process is running on another computer and the visual media search query is received, for example, through the network 708.

In some implementations, the bilingual refinement identifier has identified one or more bilingual refinements corresponding to the visual media search query in advance, and the bilingual refinement selector has selected a bilingual refinement from the one or more bilingual refinements in advance. In these implementations, the translated search query from the selected bilingual refinement and the visual media search query are sent to the results generator process 716. In some implementations, the one or more bilingual refinements corresponding to the visual media search query have been identified in advance and stored on the server 710, but a bilingual refinement has not been selected. In these implementations, the server 710 sends the identified bilingual refinements to the bilingual refinement selector 714. The bilingual refinement selector then selects a bilingual refinement corresponding to the visual media search query. The search query and the translated search query associated with the selected bilingual refinement are then sent to the results generator 716. In some implementations, some bilingual refinements corresponding to the visual media search query have been identified in advance but it is possible that others might not yet have been identified. In these implementations, the visual media search query is provided to the bilingual refinement identifier. The bilingual refinement identifier identifies any additional bilingual refinements and the pre-identified and newly identified bilingual refinements are sent to the bilingual refinement selector. The bilingual refinement selector then selects a bilingual refinement corresponding to the visual media search query. The visual media search query and the translated search query associated with the selected bilingual refinement are then sent to the results generator 716. In some implementations, no bilingual refinements corresponding to the visual media search query have been identified in advance and no bilingual refinement corresponding to the visual media search query has been selected in advance. In these implementations, when the bilingual refinement identifier 712 receives the visual media search query, it identifies one or more bilingual refinements and sends these to the bilingual refinement selector 714. The bilingual refinement selector 714 selects a bilingual refinement corresponding to the visual media search query, for example, by selecting the most frequently appearing bilingual refinement in the identified bilingual refinements corresponding to the visual media search query. The search query and the translation of the search query associated with the bilingual refinement are then sent to the results generator 716.

In some implementations, more than one bilingual refinement corresponding to the search query is selected. For example, the bilingual refinement selector can select the first and second most frequently appearing bilingual refinements. In these implementations, additional selected bilingual refinements are used much as the first selected bilingual refinement is used.

In various implementations, the results generator generates a set of search results by combining the search query and the translated search query into one query and using a search engine backend 718 to run a search corresponding to the combined query. In some implementations, the search engine backend 718 is run on the server 710, and the combined query is sent to the search engine backend, for example, through a hardware or software interface. The search engine backend 718 then sends search results responsive to the combined query to the results generator 716, for example, through a hardware or software interface. In some implementations, the search engine backend 718 is part of the results generator 716. In some implementations, the search engine backend 718 is run on a separate data processing apparatus and the search query and resulting search results are sent, for example, through the network 708. In some implementations, the results generator generates a set of search results by sending two queries to the search engine backend 718, one corresponding to the search query and one corresponding to the translated search query, receiving two sets of results from the search engine backend 718, and combining the results.

In various implementations, once the results generator 716 has generated a set of search results, the server 710 presents the search results by sending them through the network 708 to user 1's computer 706. In some implementations the server 710 can present the results in other ways, including, for example, sending the results to the process that sent the visual media search query, displaying search results on a display device, transmitting sounds, or providing haptic feedback. In some implementations, the search results are presented by a results presenter 720 run on the server 710. In some implementations, the results presenter 720 is part of the results generator 716.

Figure 8:
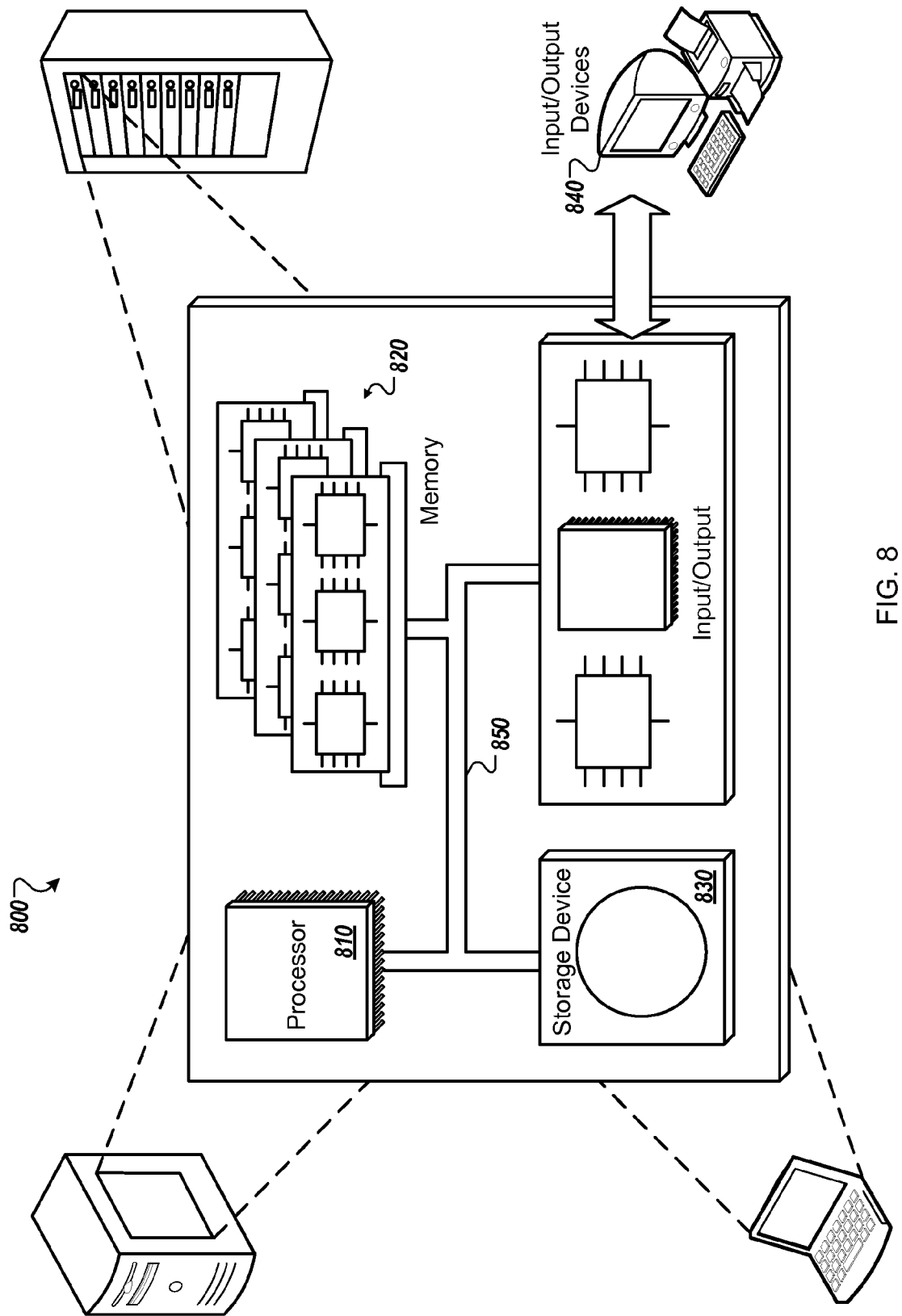
FIG. 8 is a schematic diagram of a generic computer system.

FIG. 8 is a schematic diagram of an example of a generic computer system 800. The system 800 can be used for the operations described in association with the method 500 according to one implementation. For example, the system 800 may be included in either or all of the client computer of user A, 624, the client computer of user B, 626, the client computer of user 1, 622, and the server 602.

The system 800 includes a processor 810, a memory 820, a storage device 830, and an input/output device 840. Each of the components 810, 820, 830, and 840 are interconnected using a system bus 850. Instructions that implement operations associated with the methods described above can be stored in the memory 820 or on the storage device 830. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800, including program instructions. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device. The storage device can store extractors, pattern matching engines, gadgets, machines, and programs.

The input/output device 840 provides input/output operations for the system 800. In one implementation, the input/output device 840 includes a keyboard and/or pointing device. In another implementation, the input/output device 840 includes a display unit for displaying graphical user interfaces.

The features described above can be implemented in digital electronic circuitry, integrated circuitry, specially designed ASICs (application specific integrated circuits), computer hardware, firmware, software, and/or combinations thereof. Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used in this specification, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data, including databases, include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, client computer of user 1, 622 and the server, 602, may be implemented within the same computer system.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method comprising:
   receiving, at a server, a first query comprising one or more query terms in a first language;
   after receiving the first query, receiving a set of queries at the server, each query in the set of queries being received within a predetermined threshold of receiving the first query, wherein each query in the set of queries comprises one or more query terms;
   for each query in the set of queries,
      translating, at the server, the one or more query terms into the first language; and
      comparing, at the server, the translation of the one or more query terms with the one or more query terms of the first query in the first language;
   determining, at the server, that one or more query terms of a selected query from the set of queries are a translation of the one or more query terms of the first query into a second language;
   storing, by the server, the one or more query terms of the selected query as a bilingual refinement of the first query into the second language;
   receiving, at the server, a second query in the first language;
   augmenting, at the server, the second query with the one or more query terms from the selected query; and
   obtaining, at the server, search results responsive to both the second query in the first language and the selected query in the second language.

2. The method of claim 1, wherein the first query is a first visual media search query in the first language and the second query is a second visual media search query in the first language.

3. The method of claim 2, wherein augmenting, at the server, the second query with the one or more query terms from the selected query comprises generating a combined visual media search query using the first visual media search query in the first language and the bilingual refinement in the second language.

4. The method of claim 1, wherein augmenting, at the server, the second query with the one or more query terms from the selected query comprises:
   selecting, at the server, the bilingual refinement as a most frequently appearing bilingual refinement of the second query; and
   generating, at the server, a combined search query using the second query in the first language and the bilingual refinement in the second language.

5. The method of claim 1, wherein receiving a set of queries at the server, each query in the set of queries being received within a predetermined threshold of receiving the first query comprises receiving a set of queries at the server, each query in the set of queries being received within a predetermined time period of receiving the first query.

6. The method of claim 1, wherein receiving a set of queries at the server, each query in the set of queries being received within a predetermined threshold of receiving the first query comprises receiving a set of queries at the server, each query in the set of queries being received within a predetermined number of queries of receiving the first query.

7. The method of claim 1, wherein the search results responsive to both the second query in the first language and the selected query in the second language comprise at least one result in the first language and at least one result in the second language of the bilingual refinement.

8. A system comprising:
   one or more computers and one or more storage devices storing instructions that are operable, when executed by the one or more computers, to cause the one or more computers to perform operations comprising:
   receiving a first query comprising one or more query terms in a first language;
   after receiving the first query, receiving a set of queries at the server, each query in the set of queries being received within a predetermined threshold of receiving the first query, wherein each query in the set of queries comprises one or more query terms;
   for each query in the set of queries,
      translating the one or more query terms into the first language; and
      comparing the translation of the one or more query terms with the one or more query terms of the first query in the first language;
   determining that one or more query terms of a selected query from the set of queries are a translation of the one or more query terms of the first query into a second language;
   storing the one or more query terms of the selected query as a bilingual refinement of the first query into the second language;
   receiving a second query in the first language;
   augmenting the second query with the one or more query terms from the selected query; and
   obtaining search results responsive to both the second query in the first language and the selected query in the second language.

9. The system of claim 8, wherein the first query is a first visual media search query in the first language and the second query is a second visual media search query in the first language.

10. The system of claim 9, wherein augmenting, at the server, the second query with the one or more query terms from the selected query comprises generating a combined visual media search query using the first visual media search query in the first language and the bilingual refinement in the second language.

11. The system of claim 8, wherein augmenting the second query with the one or more query terms from the selected query comprises:
   selecting the bilingual refinement as a most frequently appearing bilingual refinement of the second query; and
   generating a combined search query using the second query in the first language and the bilingual refinement in the second language.

12. The system of claim 8, wherein receiving a set of queries at the server, each query in the set of queries being received within a predetermined threshold of receiving the first query comprises receiving a set of queries at the server, each query in the set of queries being received within a predetermined time period of receiving the first query.

13. The system of claim 8, wherein receiving a set of queries at the server, each query in the set of queries being received within a predetermined threshold of receiving the first query comprises receiving a set of queries at the server, each query in the set of queries being received within a predetermined number of queries of receiving the first query.

14. The system of claim 8, wherein the search results responsive to both the second query in the first language and the selected query in the second language comprise at least one result in the first language and at least one result in the second language of the bilingual refinement.

15. A non-transitory computer-readable medium storing software comprising instructions executable by one or more computers which, upon such execution, cause the one or more computers to perform operations comprising:

receiving, at a server, a first query comprising one or more query terms in a first language;

after receiving the first query, receiving a set of queries at the server, each query in the set of queries being received within a predetermined threshold of receiving the first query, wherein each query in the set of queries comprises one or more query terms;

for each query in the set of queries, translating, at the server, the one or more query terms into the first language; and comparing, at the server, the translation of the one or more query terms with the one or more query terms of the first query in the first language;

determining, at the server, that one or more query terms of a selected query from the set of queries are a translation of the one or more query terms of the first query into a second language;

storing, by the server, the one or more query terms of the selected query as a bilingual refinement of the first query into the second language;

receiving, at the server, a second query in the first language;

augmenting, at the server, the second query with the one or more query terms from the selected query; and obtaining, at the server, search results responsive to both the second query in the first language and the selected query in the second language.

16. The computer-readable medium of claim 15, wherein the first query is a first visual media search query in the first language and the second query is a second visual media search query in the first language.

17. The computer-readable medium of claim 16, wherein augmenting, at the server, the second query with the one or more query terms from the selected query comprises generating a combined visual media search query using the first visual media search query in the first language and the bilingual refinement in the second language.

18. The computer-readable medium of claim 15, wherein augmenting, at the server, the second query with the one or more query terms from the selected query comprises:

selecting, at the server, the bilingual refinement as a most frequently appearing bilingual refinement of the second query; and generating, at the server, a combined search query using the second query in the first language and the bilingual refinement in the second language.

19. The computer-readable medium of claim 15, wherein receiving a set of queries at the server, each query in the set of queries being received within a predetermined threshold of receiving the first query comprises receiving a set of queries at the server, each query in the set of queries being received within a predetermined time period of receiving the first query.

20. The computer-readable medium of claim 15, wherein receiving a set of queries at the server, each query in the set of queries being received within a predetermined threshold of receiving the first query comprises receiving a set of queries at the server, each query in the set of queries being received within a predetermined number of queries of receiving the first query.

* * * * *